Patented May 17, 1949

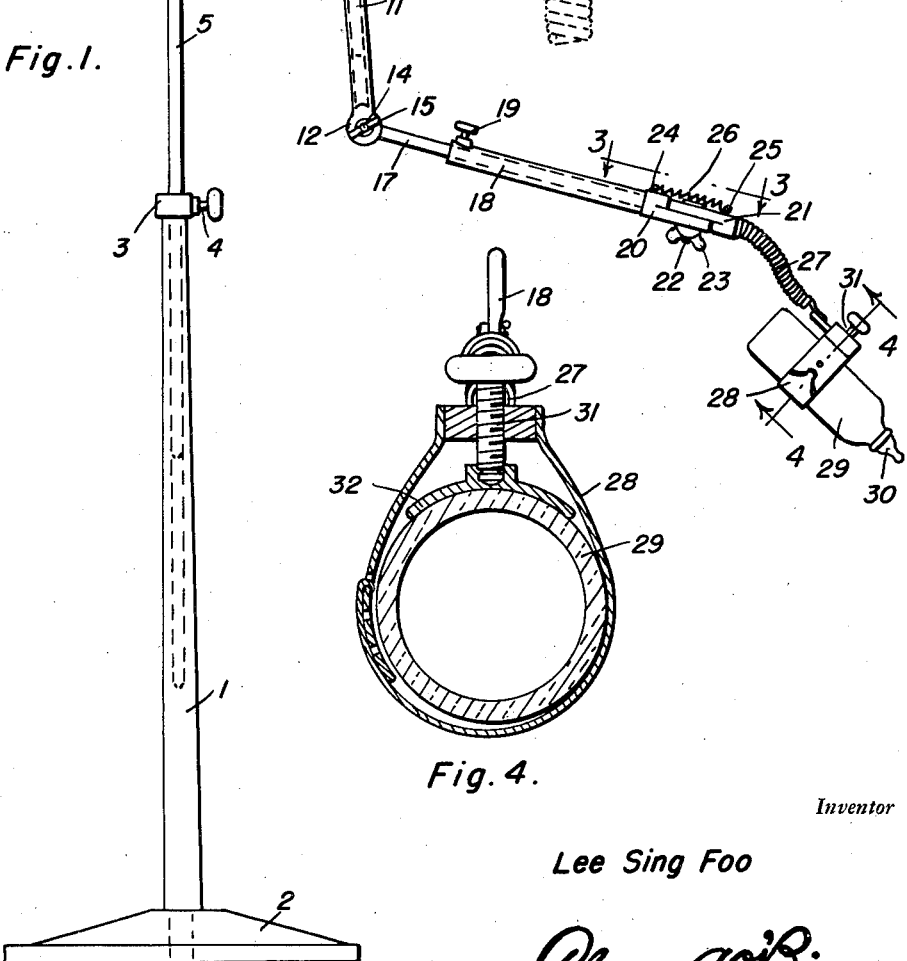

2,470,694

UNITED STATES PATENT OFFICE 2,470,694

BABY BOTTLE HOLDER

Lee Sing Foo, Manchester, N. H.

Application August 18, 1947, Serial No. 769,213

1 Claim. (Cl. 248—1)

This invention relates to improvements in baby bottle holders.

An object of the invention is to provide an improved baby bottle holder which will be adjustable to various sizes and heights of cribs.

Another object of the invention is to provide an improved form of baby bottle holder including a vertical weighted tubular standard having an inverted L-shape extension rod adjustably supported therein, with means on the upper end of said standard for clamping said rod in the desired vertical adjustment, together with a pair of interconnected telescoping extensions supported by the outer end of said rod, and adjustable bottle supporting means on the outer end of the outermost telescoping extension.

A further object of the invention is to provide an improved vertically extending weighted tubular standard with a plurality of interconnected extensions adjustably supported thereby, and a flexible and resilient bottle holder supported on the outermost end of said outer extension, whereby the bottle when full of milk will be automatically held in position for a baby to drink while lying in a crib, and when the milk is gone, resilient means will automatically snap the bottle away from drinking position.

Another object of the invention is to provide an improved baby bottle holder which will be highly efficient in operation, and relatively inexpensive to manufacture and produce.

Other objects will appear as the description proceeds.

In the accompanying drawings which form a part of this application,

Figure 1 is a side elevation of the improved baby bottle holder;

Figure 2 is a sectional view taken on the line 2—2 of Figure 1;

Figure 3 is a sectional view taken on the line 3—3 of Figure 1;

Figure 4 is a sectional view taken on the line 4—4 of Figure 1, and

Figure 5 is a vertical sectional view through the upper end of the supporting standard showing the inverted L-shape rod disposed therein.

Like characters of reference are used throughout the following specification and the accompanying drawings to designate corresponding parts.

In carrying out the invention, there is provided an improved form of baby bottle holder including a vertically extending upwardly tapered hollow supporting standard 1 having a detachable circular weighted base 2 secured to its lower end.

A collar 3 is provided at the upper end of the standard 1 and is provided with a set screw and extending radially therethrough.

An inverted L-shaped supporting rod 5 is adjustably supported in the upper end of the hollow standard 1, being held in the desired adjustment by said set screw 4.

The outer end of the rod 5 is flattened as at 6 and is bored to receive the bolt 7 and cooperating locking wing nut 8 which extends therethrough and through a bore in a similarly formed end 9 of a telescoping rod 10 which is adjustably received in the tubular extension member 11 and held in adjustment by the set screw 12.

The outer end of the member 11 is also flattened, as at 13, and is bored to receive the nut 14 and locking wing nut 15 which are used for connecting the flattened and bored end of the rod 17 in adjusted position. The rod 17 is telescopically received in the tubular extension member 18 and held in adjusted position by means of the set screw 19.

The outer end 20 of the member 18 includes a socket and enlarged flattened head which is bored and cooperates with the similarly formed socket and bored head 21, being pivotally connected together by means of the bolt 22 and wing nut 23.

Pins 24 and 25 are secured to the heads 20 and 21 and are connected together by means of the small coil spring 26.

A tightly closed spring arm 27 is supported by the head 21 at its inner end, and supports an adjustable step by step clamping band pocket 28 which is adapted to surround and clamp around one of a various size of baby bottles 29 which support a nipple 30 on its lower or outer end. A wing clamping screw 31 extends through the pocket 28 and is swivelly connected with the arcuate bottle engaging clamp plate 32 for locking the bottle 29 in fixed position.

When the bottle is full of milk, the weight of the same will hold the bottle extended in proper drinking position for a baby in a crib, but as soon as the milk has been drunk, the lightened bottle will be snapped to the side by the spring 26 out of the way.

From the foregoing description, it will be apparent that there has been devised and provided a highly efficient form of baby bottle holder which may be manufactured at a relatively low expense.

While the preferred embodiment of the instant invention has been illustrated and described, it will be understood that it is not intended to limit the scope of the invention thereto, as many minor changes in detail of construction may be resorted to without departure from the spirit of the invention.

Having described the invention, what is claimed as new is:

A baby bottle holder including a vertical hollow standard having a weighted base detachably secured thereto, an inverted L-shaped supporting rod supported in the upper end of said standard, pivotally interconnected telescoping extensions supported at the outer end of said rod, pivotally connected heads supported at the outer end of said outermost extension, a flexible connection supported by the outermost head, an adjustable band bottle encircling bracket on the outer end of said flexible connection, and a screw clamp plate supported by said bracket said clamp plate and bracket together supporting a baby bottle.

LEE SING FOO.

REFERENCES CITED

The following references are of record in the file of this patent:

UNITED STATES PATENTS

| Number | Name | Date |
|---|---|---|
| 354,705 | Kenderdine | Dec. 21, 1886 |
| 1,077,190 | Degenfelder | Oct. 28, 1913 |
| 1,220,266 | Ott | Mar. 27, 1917 |
| 1,602,003 | Drake | Oct. 5, 1926 |
| 2,258,076 | Taylor et al. | Oct. 7, 1941 |

FOREIGN PATENTS

| Number | Country | Date |
|---|---|---|
| 408,477 | Great Britain | Apr. 12, 1934 |
| 446,123 | Great Britain | Apr. 24, 1936 |